United States Patent
Mueller

(10) Patent No.: US 9,656,604 B2
(45) Date of Patent: May 23, 2017

(54) AUDIO SIGNAL FOR A SYNTHETIC NOISE OF A MOTOR VEHICLE AS WELL AS METHOD FOR GENERATING SAID AUDIO SIGNAL

(71) Applicant: Schaeffler Technologies AG & Co. KG, Herzogenaurach (DE)

(72) Inventor: Felix Mueller, Ruegland (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/768,178

(22) PCT Filed: Jan. 21, 2014

(86) PCT No.: PCT/DE2014/200017
§ 371 (c)(1),
(2) Date: Aug. 14, 2015

(87) PCT Pub. No.: WO2014/127773
PCT Pub. Date: Aug. 28, 2014

(65) Prior Publication Data
US 2016/0016511 A1 Jan. 21, 2016

(30) Foreign Application Priority Data
Feb. 22, 2013 (DE) .................. 10 2013 202 890

(51) Int. Cl.
*H04B 1/00* (2006.01)
*B60Q 5/00* (2006.01)
(Continued)

(52) U.S. Cl.
CPC ............... *B60Q 5/008* (2013.01); *G10H 1/12* (2013.01); *G10K 15/02* (2013.01); *H04R 1/22* (2013.01);
(Continued)

(58) Field of Classification Search
USPC ..... 381/71.1, 73.1, 94.1, 94.5, 86, 302, 317, 381/365, 389
See application file for complete search history.

(56) References Cited

U.S. PATENT DOCUMENTS

| 4,276,802 A | 7/1981 | Mieda |
| 2005/0094826 A1 | 5/2005 | Morishita |

(Continued)

FOREIGN PATENT DOCUMENTS

| DE | 2734948 | 2/1979 |
| DE | 197 46 523 | 5/1998 |

(Continued)

*Primary Examiner* — Yosef K Laekemariam
(74) *Attorney, Agent, or Firm* — Davidson, Davidson & Kappel, LLC

(57) ABSTRACT

A method for generating an audio signal for a synthetic noise of a motor vehicle is provided. An audio signal for the synthetic noise of a motor vehicle is also provided. In one step of the method, a signal is provided that represents a noise. Moreover, a fundamental frequency is specified that represents an operating rotational speed of the motor of the vehicle. In another step of the method, several filters are applied to the noise signal. These filters each have a mid-frequency linked to the specified fundamental frequency via an order factor. At least several of the order factors are whole numbers, so that these filters filter the harmonic components of the fundamental frequency. The order factors and the amplitude curves of the filters are selected according to the sound characteristic of the motor vehicle noise that is to be synthesized. The noise signal weighted by the filters constitutes the audio signal for the synthetic noise of the motor vehicle as a function of the operating rotational speed of the motor of the vehicle.

10 Claims, 3 Drawing Sheets

(51) Int. Cl.
  *G10H 1/12* (2006.01)
  *G10K 15/02* (2006.01)
  *H04R 1/22* (2006.01)

(52) U.S. Cl.
  CPC . *G10H 2250/211* (2013.01); *G10H 2250/295* (2013.01); *G10H 2250/381* (2013.01); *H04R 2499/13* (2013.01)

(56) References Cited

U.S. PATENT DOCUMENTS

| | | |
|---|---|---|
| 2005/0169484 A1 | 8/2005 | Cascone et al. |
| 2006/0177797 A1 | 8/2006 | Costello et al. |
| 2012/0275612 A1 | 11/2012 | Vogel et al. |
| 2014/0328498 A1 | 11/2014 | Le-Hir et al. |

FOREIGN PATENT DOCUMENTS

| | | | | |
|---|---|---|---|---|
| DE | 10 2009 055 777 | | 6/2011 | |
| DE | 10 2011 102 709 | | 11/2012 | |
| EP | 0 469 023 | | 2/1992 | |
| EP | 0433594 | | 8/1995 | |
| FR | 2974441 | | 10/2012 | |
| GB | 2476470 | * | 6/2011 | ............. G10K 15/02 |
| JP | H08137490 | | 5/1996 | |
| JP | 2007258980 | | 10/2007 | |
| JP | 2009063968 | * | 3/2009 | ............. B60R 11/02 |
| WO | WO01/33543 | | 5/2001 | |
| WO | WO2006097188 | | 9/2006 | |

* cited by examiner

AUDIO SIGNAL FOR A SYNTHETIC NOISE OF A MOTOR VEHICLE AS WELL AS METHOD FOR GENERATING SAID AUDIO SIGNAL

The present invention relates to a method for generating an audio signal for a synthetic noise of a motor vehicle, for instance, a vehicle with an internal combustion engine or a vehicle having an electric motor as the drive. Moreover, the invention relates to said audio signal for the synthetic noise of a motor vehicle. Such audio signals are emitted during the operation of the motor vehicle and serve, for example, to protect pedestrians.

BACKGROUND

German patent application DE 10 2011 102 709 A1 discloses a device for generating sounds that simulate the operating noises of a motor vehicle. This device comprises a real-time-capable processing unit with which operating parameters of the motor vehicle are detected. The channels of a multi-channel sample player are actuated as a function of the detected operating parameters in order to generate the operating noises.

German patent application DE 10 2009 055 777 A1 discloses a method for the synthetic generation of an engine noise, whereby a data memory is employed in which several signal samples having function values are stored. The signal samples are retrieved in a manner adapted to the rotational speed and as a function of detected operating parameters of the motor.

German patent specification DE 197 46 523 B4 discloses a method for generating sounds in motor vehicles, whereby, to start with, the rotational speed of the motor of the vehicle is detected. On the basis of the determined rotational speed, a fundamental frequency of the noise emitted by the motor is calculated. Moreover, the load condition of the motor is ascertained by a load condition sensor. On the basis of the load condition, harmonic components relating to the fundamental frequency are selected, whereby the entire spectrum is raised towards higher loads.

European patent specification EP 0 469 023 B1 discloses a sound-amplifying system for use in a vehicle, comprising a source of stored signals for operating noises of vehicles. Moreover, signal sources serve to provide signals relating to the vehicle operation such as, for example, vehicle acceleration signals, motor operation signals, throttle-valve-position signals and gear shift signals.

SUMMARY OF THE INVENTION

Starting from the state of the art, the objective of the present invention is to simplify the provision of audio signals for synthetic noises of motor vehicles. It is especially intended to dispense with the laborious sound-recording of the natural noises of such motor vehicles.

The present invention provides a method for generating an audio signal for a synthetic noise of a motor vehicle. The present invention also provides an audio signal for a synthetic noise of a motor vehicle.

The present invention provides a method to generate an audio signal that represents a synthetic noise of a motor vehicle. The audio signal is intended to be emitted via loudspeakers during the operation of the vehicle. The emitted audio signal should be perceived, for example, by the vehicle occupants or else by other persons such as, for instance, pedestrians in the immediate vicinity of the vehicle. The vehicle can have, for example, an internal combustion engine or an electric motor serving as the drive. Especially in the case of the very quiet electric vehicles, such synthetic noises should make it easier for the vehicle to be perceived acoustically.

In one step of the method according to the invention, a signal is provided that represents a noise. Fundamentally speaking, the noise can have any desired characteristic. Moreover, the noise can have been generated synthetically or naturally. Noise signals are available in many different forms and can be provided very easily. The noise signal is preferably present in digital form. In another step of the method according to the invention, a fundamental frequency is specified that represents an operating rotational speed of the motor of the vehicle. In the simplest case, the fundamental frequency is equal to the rotational speed of the motor of the vehicle, whereby the various units, especially the "rpm" unit and the "hertz" unit, have to be converted accordingly. In the simplest case, the fundamental frequency is specified by defining a value or several values of the fundamental frequency. However, the fundamental frequency can also be specified by providing a signal that has the fundamental frequency.

In another step of the method according to the invention, several filters are applied to the noise signal. These filters are preferably configured in the form of bandpass filters, especially preferably as narrow-bandpass filters. The filters each have a mid-frequency that is linked to the specified fundamental frequency via an order factor. At least several of the order factors are whole numbers, so that these filters filter the harmonic components of the fundamental frequency, that is to say, allow them to pass. The order factors and the amplitude curves of the filters are selected according to the sound characteristic of the motor vehicle noise that is to the synthesized. Thus, the characteristic of the noise that is to be synthesized can be determined in accordance with the specifications through the selection of the order factors and of the amplitude curves of the filters. The noise signal weighted by the filters constitutes the audio signal for the synthetic noise of the motor vehicle as a function of the operating rotational speed of the motor of the vehicle. The audio signal is preferably present in digital form.

A particular advantage of the method according to the invention consists of the fact that it can be carried out very easily. There is no need to record the sound of a comparable vehicle in order to be able to generate the noise that is to be synthesized. The method according to the invention can be executed, for example, on a computer using standard programs.

In preferred embodiments of the method according to the invention, at least one broadband pass filter is applied to the noise signal. The broadband pass filter is independent of the fundamental frequency and it represents a noise during the operation of the motor vehicle that is independent of the operating rotational speed of the motor of the vehicle. Owing to the broadband pass filter or to the multiple broadband pass filters, it is possible to synthesize noises such as, for instance, wind noises and tire noises. The broadband pass filter or the multiple broadband pass filters can each be formed by a high-pass filter, a low-pass filter or a bandpass filter.

The sound is preferably in the form of white noise. White noise is widely available as a standard signal and can therefore be provided very easily. However, the sound that is to be provided can also have a different characteristic.

In preferred embodiments of the method according to the invention, the operating rotational speed of the motor of the vehicle comprises the rotational speed of the drive motor of the vehicle. For instance, the operating rotational speed represents the rotational speed of an internal combustion engine or of an electric motor that propels the vehicle.

Corresponding to the rotational speeds found in the drive motor of vehicles, the fundamental frequency is preferably between 0.1 Hz and 200 Hz, especially preferably between 1 Hz and 100 Hz.

The fundamental frequency is preferably specified in that a pulse sequence is provided that is representative of the operating rotational speed of the motor of the vehicle and that has the fundamental frequency. The pulse sequence is especially representative of the drive motor of the vehicle and therefore can be considered as an artificial rotational speed channel.

The filters each have a bandwidth that is preferably between 5 Hz and 50 Hz, especially preferably between 10 Hz and 30 Hz.

The filters are preferably in the form of a Kalman filter. Kalman filters are particularly well-suited for filtering the harmonic components. However, other narrow-band filter types can also be employed.

In a preferred embodiment of the method according to the invention, several of the order factors are selected from the group consisting of the whole numbers from 2 up to and including 10, as a result of which the noise of an internal combustion engine can be synthesized. In particular, the order factors preferably comprise the numbers 2, 4, 6 and 8 or the numbers 3, 6 and 9. In this manner, for example, the noise of an internal combustion engine with four cylinders or with six cylinders can be synthesized.

In an alternative preferred embodiment of the method according to the invention, several of the order factors are whole numbers and are greater than or equal to 20. In this context, the order factors likewise preferably comprise one or more of the numbers 20, 40, 47, 80, 120 and 240. These embodiments of the method according to the invention are suitable for generating the audio signal of the synthetic noise of a vehicle that has electric motors as the drive motors.

In special embodiments, in order to represent the sound of a special vehicle or of a special drive motor, some of the order factors are not whole numbers. For instance, some of the order factors can be formed by vulgar fractions having two as the denominator.

In most cases, the operating rotational speed of the motor of the vehicle is not constant. For this reason, it is preferably not merely a constant fundamental frequency that is provided. Preferably, several fundamental frequencies are specified. Especially preferably, the fundamental frequency is specified as a quantity that varies over time, whereby the fundamental frequency varies between a minimum value and a maximum value during the time span. If the fundamental frequency is specified by providing a pulse sequence, then the fundamental frequency preferably varies between a minimum value and a maximum value during the time span. This is then an artificial rotational speed channel with a variable rotational speed. The time span is preferably between 10 s and 200 s.

The mid-frequencies of the filters preferably change in the same manner as the fundamental frequency that varies over time. Therefore, when the filters are applied to the noise signal, the mid-frequencies of the filters change with the fundamental frequency that varies over time. The link of the mid-frequencies to the fundamental frequency via the order factors is always retained in this process.

In a first preferred embodiment, the fundamental frequency varies continuously during the time span, so that a ramp is formed, for example, in the form of a rotational speed ramp. In the case of the time-dependent synthesized noise of the motor vehicle, the time concurrently represents the operating rotational speed of the motor of the vehicle.

In a second preferred embodiment, the fundamental frequency changes discretely during the time span, so that only a representative selection of values for the operating rotational speed is presented. If the varying fundamental frequency is specified by a pulse sequence, then there are several signal sections of the pulse sequence that have different fundamental frequencies, whereby the fundamental frequency within the signal sections is constant in each case. The signal sections of the pulse sequence can also be formed by separate individual signals. By the same token, the generated audio signal for the synthetic noise of the motor vehicle can have several signal sections or else can be formed by several individual signals.

Preferably, the audio signal for the synthetic noise of the motor vehicle is stored in the vehicle, for instance, as a digital audio signal in a data memory, prior to the operation of the motor vehicle. As a result, the generated audio signal is available during the operation of the motor vehicle.

The generated audio signal is preferably emitted depending on the intended use. Consequently, this is a method for generating and emitting an audio signal for a synthetic noise of a motor vehicle. For this purpose, the method according to the invention preferably comprises the following additional steps which are carried out during the operation of the motor vehicle: in one of these steps, a momentary value of the rotational speed of the motor of the vehicle is measured. Moreover, the time segment that is selected for the audio signal that represents the synthetic noise of the motor vehicle is one during which the fundamental frequency comes closest to the momentary value of the rotational speed of the motor of the vehicle. If the fundamental frequency of the audio signal changes discretely, then this selection is made on the basis of a decision as to which of the various values of the fundamental frequency are to be compared to the measured momentary value of the rotational speed. If the fundamental frequency of the generated audio signal changes continuously, then a time segment of the audio signal has to be selected that is near a value of the fundamental frequency that equals the measured momentary value of the operating rotational speed. The selected section of the audio signal that represents the synthetic noise of the motor vehicle is emitted via at least one loudspeaker installed in the vehicle. The one loudspeaker or the multiple loudspeakers can be directed towards the inside of the motor vehicle or else towards the outside of the motor vehicle. The above-mentioned steps consisting of measuring the momentary value of the rotational speed, selecting a time segment of the audio signal that represents the synthetic noise of the motor vehicle, and emitting the selected section of the audio signal that represents the synthetic noise of the motor vehicle are repeated continuously as well as periodically during the operation of the motor vehicle. This translates into a continuous adaptation of the emitted noise to the momentary value of the rotational speed of the motor of the vehicle.

As already mentioned, the operating rotational speed is preferably the rotational speed of a drive motor of the motor vehicle. It is likewise preferred for the momentary value of the pedal position and/or for the momentary value of the speed of the motor vehicle to be measured. The measured values of the pedal position and/or of the speed of the motor vehicle can be utilized to change the characteristic of the narrow-band filter.

The audio signal according to the invention for a synthetic noise of a motor vehicle can be generated with the method according to the invention. Preferred embodiments of the audio signal according to the invention can be generated with preferred embodiments of the method according to the invention.

BRIEF DESCRIPTION OF THE DRAWINGS

Additional details and refinements of the invention can be gleaned from the description below of a preferred embodiment of the method according to the invention, making reference to the drawing. The following is shown.

DETAILED DESCRIPTION

Figure 1:
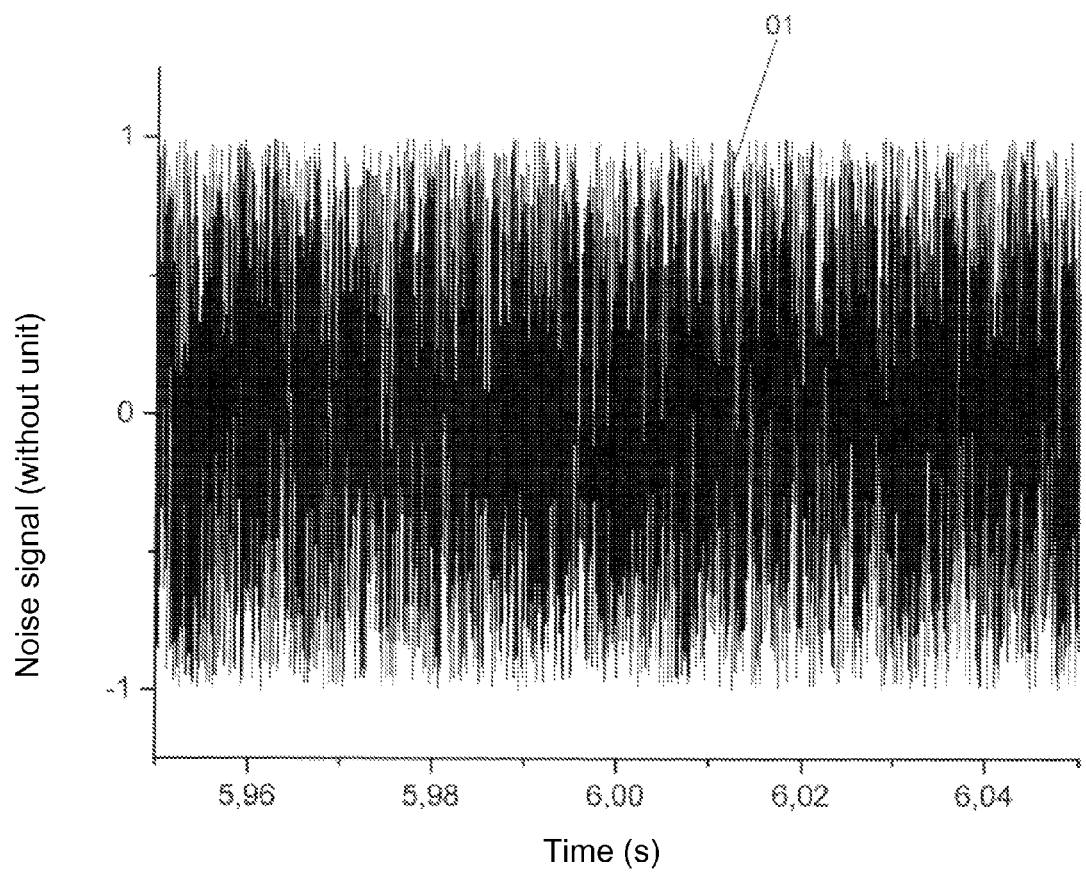
FIG. 1 a depiction of the course over time of white noise that is provided according to a preferred embodiment of the invention.

FIG. 1 is a depiction of the course over time of a signal 01 of white noise that is provided according to a preferred embodiment of the method according to invention. Only a short time segment of about 0.1 s is depicted. The signal 01 of the white noise has a time duration of, for instance, 60 s.

Figure 2:
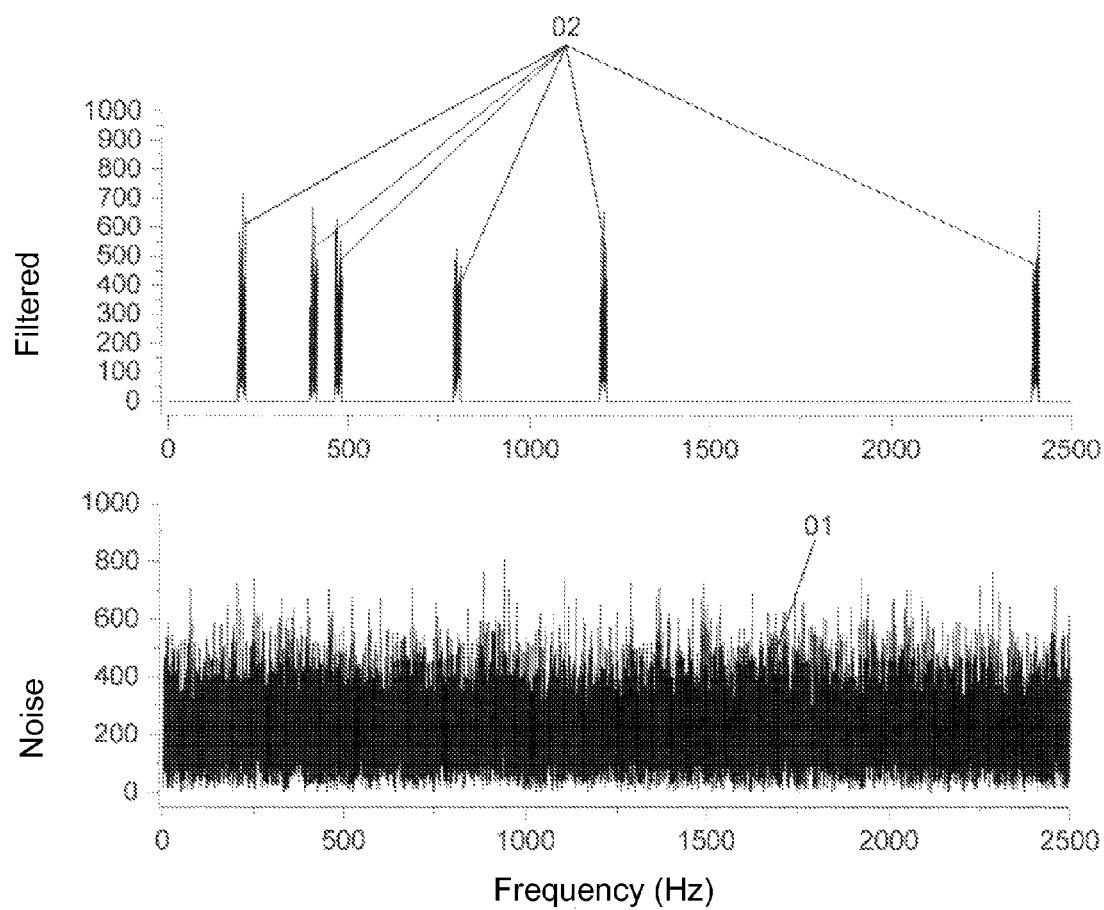
FIG. 2 a spectral depiction of the noise shown in FIG. 1, before and after filtering through several filters.

FIG. 2 comprises spectral depictions of the noise shown in FIG. 1, before and after filtering through several filters. The lower segment shows the signal spectrum 01 of the white noise from 0 Hz to 2,500 Hz. According to the invention, the signal 01 of the white noise is filtered through several Kalman filters. In the embodiment shown, the noise being synthesized is that of a vehicle that has an electric motor as the drive motor. The rotational speed of the electric motor forms a fundamental frequency. The Kalman filters used have mid-frequencies that are 20, 40, 47, 80, 120 and 240 times the value of the fundamental frequency. The upper part of FIG. 2 shows a signal spectrum 02 of the filtered noise. The narrow-band Kalman filters of the $20^{th}$, $40^{th}$, $47^{th}$, $80^{th}$, $120^{th}$ and $240^{th}$ order yield corresponding narrow-band spectral ranges.

The noise signal filtered through the Kalman filters constitutes the audio signal 02 that is to be generated. The audio signal 02 is suitable to represent the noise of a vehicle that has an electric motor as the drive motor, whereby the noise is related to the rotational speed of the electric motor.

Figure 3:
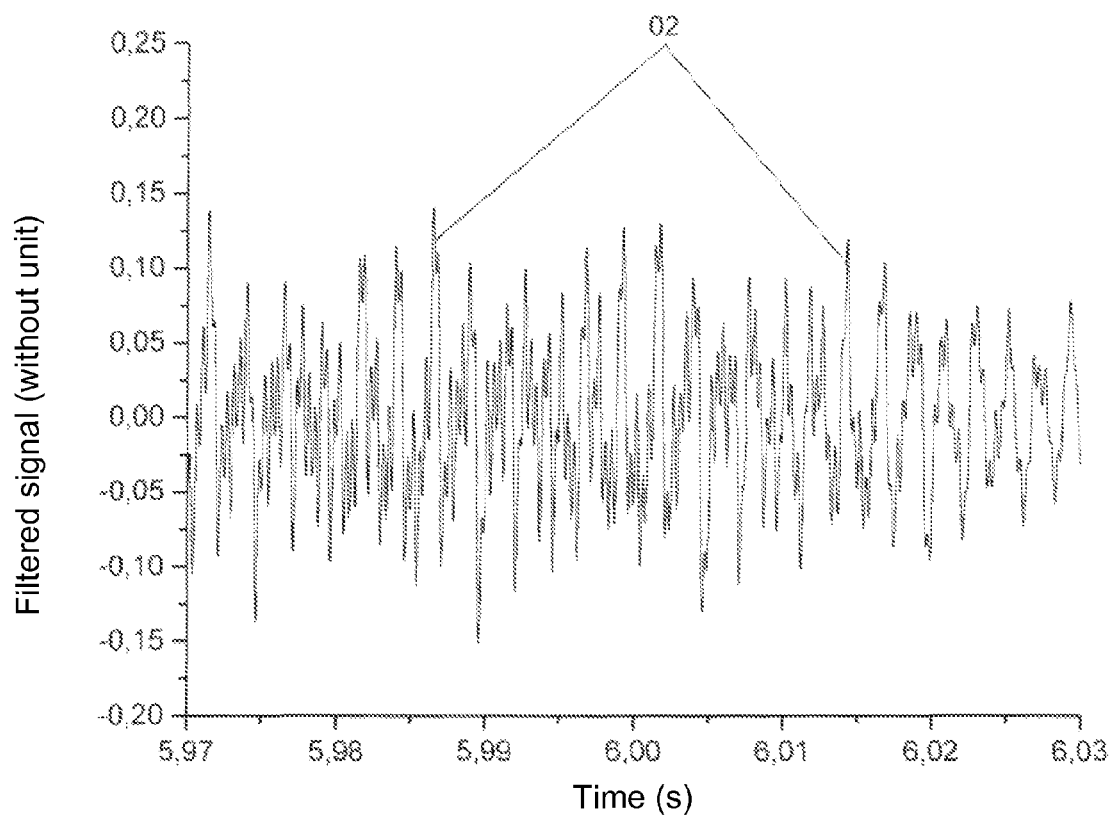
FIG. 3 a depiction of the course over time of the noise shown in FIG. 2, before and after filtering through several filters.

FIG. 3 comprises a depiction over time of the audio signal 02 shown in FIG. 2. Here, too, only a small time segment of about 0.06 s is depicted. The audio signal 02 has the same total duration as the signal 01 of the white noise shown in FIG. 1.

LIST OF REFERENCE NUMERALS

01 white noise signal
02 audio signal generated by filtering the noise signal

The invention claimed is:

1. A method for generating an audio signal for a synthetic noise of a motor vehicle, comprising the following steps: providing a noise signal representing a noise;
specifying a fundamental frequency representing an operating rotational speed of the motor of the vehicle; and
applying multiple filters to the noise signal, the filters each having a mid-frequency linked to the fundamental frequency via an order factor, at least several of the order factors being whole numbers, and whereby the order factors and amplitude curves of the filters are selected according to a sound characteristic of the motor vehicle noise to the synthesized;
the noise signal weighted by the filters constituting an audio signal for the synthetic noise of the motor vehicle as a function of an operating rotational speed of the motor of the vehicle.

2. The method as recited in claim 1 wherein at least one broadband pass filter is also applied to the noise signal, the broadband pass filter being independent of the fundamental frequency and representing a noise during the operation of the motor vehicle independent of the operating rotational speed of the motor of the vehicle.

3. The method as recited in claim 1 wherein the sound is in the form of white noise.

4. The method as recited in claim 1 wherein the fundamental frequency is specified in that a pulse sequence is provided representative of the operating rotational speed of the motor of the vehicle and having the fundamental frequency.

5. The method as recited in claim 1 wherein several of the order factors are selected from the group consisting of the whole numbers from 2 up to and including 10.

6. The method as recited in claim 1 wherein several of the order factors are whole numbers greater than or equal to 20.

7. The method as recited in claim 1 wherein the fundamental frequency is specified as a quantity varying over time, the fundamental frequency varying between a minimum value and a maximum value during the time span.

8. The method as recited in claim 7 wherein, when the filters are applied to the noise signal, the mid-frequencies of the filters change with the fundamental frequency varying over time.

9. The method as recited in claim 1 further comprising the following additional steps carried out during the operation of the motor vehicle:
measuring a momentary value of the rotational speed of the motor of the vehicle is measured;
selecting a time segment for the audio signal representing the synthetic noise of the motor vehicle, the time segment being one during which the fundamental frequency comes closest to the momentary value of the rotational speed of the motor of the vehicle;
emitting the selected segment of the audio signal representing the synthetic noise of the motor vehicle via a loudspeaker installed in the motor vehicle; and
periodically repeating the measuring, selecting and emitting steps.

10. An audio signal for a synthetic noise of a motor vehicle generated employing the method as recited in claim 1.

* * * * *